United States Patent
Hoffmann et al.

[11] Patent Number: 5,944,534
[45] Date of Patent: Aug. 31, 1999

[54] FUNCTIONAL MODULE

[75] Inventors: Ernst Wilhelm Hoffmann, Herscheid; Rudiger Menz, Iserlohn; Jorg Welschholz, Herscheid, all of Germany

[73] Assignee: Leopold Kostal GmbH & Co. KG, Ludenscheid, Germany

[21] Appl. No.: 08/972,492

[22] Filed: Nov. 18, 1997

[30] Foreign Application Priority Data

Dec. 2, 1996 [DE] Germany ............................ 196 49 857

[51] Int. Cl.$^6$ .................................................. H01R 35/00
[52] U.S. Cl. ............................... 439/15; 439/34; 307/10.1
[58] Field of Search ................................ 439/15, 34, 164; 307/10.1

[56] References Cited

U.S. PATENT DOCUMENTS

| | | | |
|---|---|---|---|
| 5,747,763 | 5/1998 | Uchiyama et al. | 439/15 |
| 5,766,019 | 6/1998 | Matsumoto et al. | 439/15 |
| 5,769,649 | 6/1998 | Welscholz et al. | 439/15 |
| 5,856,710 | 1/1999 | Baughman et al. | 307/10.1 |
| 5,883,348 | 3/1999 | Yokoyama | 439/15 |

FOREIGN PATENT DOCUMENTS 28 10 790 B2   1/1980   Germany .

Primary Examiner—Gary F. Paumen
Attorney, Agent, or Firm—Brooks & Kushman P.C.

[57] ABSTRACT

A steering column module electrically connected to the electrical system of a vehicle with the fewest number of connector parts is attached to the outer tube of a steering column of the motor vehicle. The module includes a carrier and functional units attached to the carrier. The carrier is attached to the outer tube of the steering column. Plug-in connector parts are provided on the lower sides of the functional units. A plate-shaped distributing device having upper and lower sides is also included. The distributing device encompasses the steering column and is aligned perpendicular thereto. The distributing device includes mating connector parts on its upper side and a plug-in connector arrangement on its lower side. Each mating connector part is coupled to a respective one of the plug-in connector parts. The plug-in connector arrangement is electrically connected to the mating connector parts and is coupled to a connecting connector part provided on the steering column and linked to the electrical system to electrically connect the module to the electrical system.

15 Claims, 1 Drawing Sheet

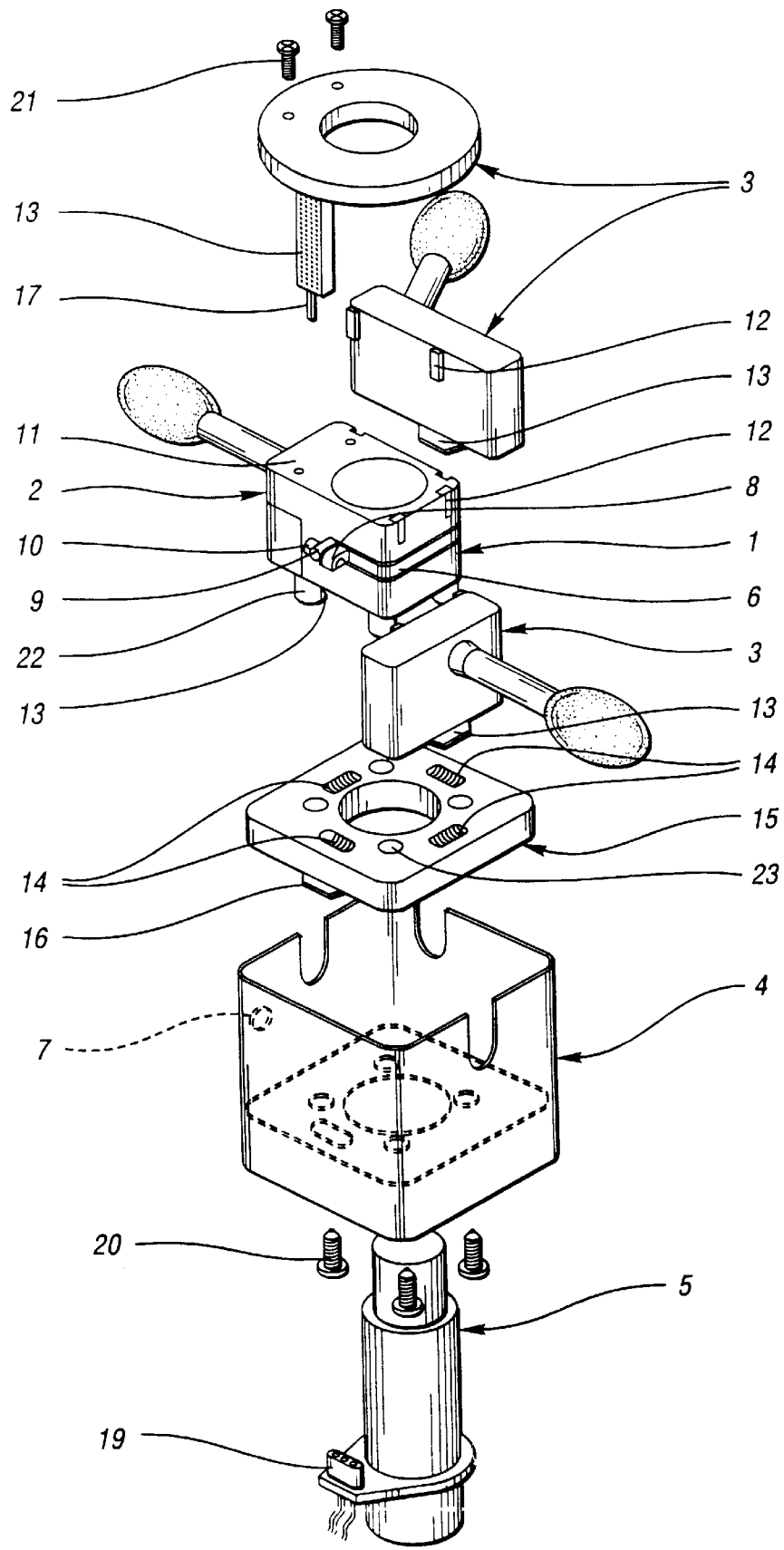

FUNCTIONAL MODULE

TECHNICAL FIELD

The present invention is related to a steering column module for accommodating functional units such as switches, levers, and buttons to a steering column of a vehicle.

BACKGROUND ART

Motor vehicle steering column modules accommodate functional units to the steering column in a convenient manner. The functional units of such a steering column module can be, for example, electric switches, levers, and buttons. Actuating these functional units, for example, initiates functions on the motor vehicle, such as head lights, parking lights, side lights, direction indicators, windshield wiping/washing, and the like. The functional units may also include steering column angle sensors.

DE 28 10 790 B2 discloses a steering column module for use on motor vehicles. The steering column module consists essentially of a carrier fixed on the outer tube of the steering column and several functioning units. The functioning units are designed as electrical switches and are attached to the carrier. Each functioning unit is provided with a plug-in connector part. The plug-in connector parts couple to corresponding connecting connector parts on the outer tube of the steering column to connect the functioning units to the motor vehicle electrical system.

However, in DE 28 10 790 B2, some functional units are available only as optional features for motor vehicle electrical systems. In other words, in addition to the standard features, vehicle purchasers can select optional features to suit personal tastes. The functions of such optional features can then be achieved by adding functional satellite units to the carrier. The problem then arises that in order to connect such a steering column module to the electrical system, a plurality of, possibly different, connecting connector parts are required. These must be coupled to respective ones of a plurality of, possibly different, plug-in connector parts. However, it is troublesome to handle several connecting connector parts in the region of the steering column. This task is also associated with considerable expense and risk of confusion.

SUMMARY OF THE INVENTION

Accordingly, it is an object of the present invention to provide a steering column module having functional units in which the electrical connection of the steering column module to the motor vehicle electric system can be conveniently achieved with the fewest number of connecting connector parts provided on the steering column at a central site.

In carrying out the above object and other objects, the present invention provides a steering column module for a steering column of a vehicle. The steering column module includes a carrier (1) attached to the steering column. A plurality of functional units (2, 3) are provided in a region of the steering column below the steering wheel. The functional units (2, 3) are encompassed by a housing (4) disposed in a plane perpendicular to the steering column. The functional units (2, 3) are attached to the carrier (1). The functional units (2, 3) include a functional base unit (2) and a functional satellite unit (3). Each of the functional units (2, 3) has an upper side facing the steering wheel and a lower side remote from the steering wheel.

A plug-in connector part (13) is provided on the lower side of each of the functional units (2, 3). A plate-shaped distributing device (15) is attached to the carrier (1). The distributing device (15) encompasses the steering column and is aligned perpendicular thereto. The distributing device (15) has an upper side facing the steering wheel and a lower side remote from the steering wheel. Mating connector parts (14) are provided on the upper side of the distributing device (15). Each one of the mating connector parts (14) is coupled to a respective one of the plug-in connector parts (13). A single plug-in connector arrangement (16) is provided on the lower side of the distributing device (15). The single plug-in connector arrangement (16) is electrically connected to the mating connecting parts (14) and is coupled to a connecting connector part (19) provided on the steering column and linked to the electrical system to electrically connect the steering column module to the electrical system.

Further, in carrying out the above object and other objects, the present invention provides a steering column module connection system in accordance with the steering column module.

The advantages accruing to the present invention are numerous. It is particularly advantageous that the plug-in connector parts and the mating connector parts required for internal coupling of the steering column module are provided directly on the functional units and on the distributing device, respectively. Thus, when assembling the steering column module to the steering column, it is completely unnecessary to handle the plug-in connector arrangement connected to the flexible electrical power lines. A mechanical and electrical connection between the steering column module and the distributing device is provided simultaneously by the plug-in and mating connector parts.

These and other features, aspects, and embodiments of the present invention will become better understood with regard to the following description, appended claims, and accompanying drawings.

BRIEF DESCRIPTION OF THE DRAWING

The FIGURE shows an exploded perspective view of a steering column module for motor vehicles in accordance with the present invention.

BEST MODES FOR CARRYING OUT THE INVENTION

Referring now to the FIGURE, the steering column module of the present invention includes a carrier 1. A functional base unit 2 and a plurality of functional satellite units 3 are connected to carrier 1. Carrier 1 fixes to an outer tube 5 of the steering column by way of an attachment device. Each of the functional units 2 and 3 has an upper side facing the steering wheel (not specifically shown) of the steering column and a lower side remote from the steering wheel. The upper sides face away from outer tube 5 of the steering column. The functional units 2 and 3 are provided in a region of the steering column below the steering wheel and are encompassed by a common housing 4 disposed in a plane perpendicular to the steering column.

As is furthermore evident from the FIGURE, the attachment device is designed like a clamp and is integrated as one piece in carrier 1. The attachment device includes a tongue 6 which extends in the peripheral direction of outer tube 5. Tongue 6 is formed preferably as one-piece zinc die casting in carrier 1. Tongue 6 can be tightened by a screw 10. For this purpose, a first attachment block 8 is provided at the free end of tongue 6. First attachment block 8 has a threaded bore and protrudes perpendicular from tongue 6. A second attachment block 9 is provided on carrier 1 opposite from first attachment block 8. Second attachment block 9 likewise protrudes perpendicularly from tongue 6. The two attachment blocks 8 and 9 are arranged at a spaced disposition with respect to each other so that when actuating the attached screw 10, tongue 6 is tightened causing considerable clamping forces to be exerted on outer tube 5. As a result, a convenient and reliable fixing of carrier 1 to outer tube 5 is guaranteed.

Moreover, a partial section 11 of the housing of functional base unit 2 forms as one with carrier 1. Functional base unit 2 is thus a quasi part of carrier 1 and, after being attached to the carrier, the functional base unit cannot be detached from the carrier without great effort. On the other hand, functional satellite units 3 are releasably attachable to carrier 1 such that they can be released from the carrier in a rapid and convenient manner by retaining elements 12. Replacing one of functional satellite units 3 or adding more functional satellite units to carrier 1 is possible without great effort. Communicating added functional satellite units at a later time to carrier 1, such as after the installation of the steering column module into the motor vehicle, is also possible without great effort.

In the present exemplified embodiment, retaining elements 12 of carrier 1 and of two of the three illustrated functional satellite units 3 are designed as swallow-tail shaped grooves and tongues. These retaining elements 12 extend in the longitudinal direction of outer tube 5 so that the two functional satellite units 3 can be pushed onto carrier 1 or onto functional base unit 2 for the purpose of attachment on the upper side of the functional base unit.

The other one of the three functional satellite units 3 can be fixed to an upper side of carrier 1 facing the steering wheel by way of two screws 21. It is, however, equally possible to attach the three illustrated functional satellite units 3 to carrier 1 merely by using screw connections or by way of groove and tongue connections. In the illustrated exemplified embodiment, the two functional satellite units 3 provided with tongues are, however, finally fixed in their position on carrier 1 by attaching the one functional satellite unit 3 to be attached to the carrier by the two screws 21. The two functional satellite units 3 provided with tongues are finally fixed because the other functional satellite unit 3 covers the upper sides, i.e., the sides facing the steering wheel, of the other two functional satellite units 3 and these units can no longer be removed from carrier 1.

Both functional base unit 2 and the three functional satellite units 3 include on their lower sides, i.e., the sides remote from the steering wheel, a plug-in connector part 13. The four plug-in connector parts 13 directly couple to respective mating connector parts 14 on plate-shaped distributing device 15 to make a mechanical and electrical connection therebetween. Distributing device 15 is likewise fixable to carrier 1. Distributing device 15 encompasses the steering column, at least partially, and is aligned perpendicular thereto. Mating connector parts 14 are provided with their plug-in faces on the upper side, i.e., the sides facing the steering wheel, of distributing device 15. Plug-in connector parts 13 and mating connector parts 14 of distributing device 15 couple with each other by simple attachment of functional base unit 2 and/or the three functional satellite units 3 to carrier 1.

Each of plug-in connector parts 13 of the three functional satellite units 3 and of functional base unit 2 are surrounded by a protective collar. These protective collars produce either a positive or non-positive locking mechanical connection to distributing device 15. For the locking mechanical connections, the four mating connector parts 14 of distributing device 15 each include a channel surrounding their respective mating connector contact elements. The channels lie against a protective collar of a respective one of the four plug-in connector parts 13. Consequently, the joining of the channels and the collars simultaneously produces in a convenient manner a locking mechanical connection between functional units 2 and 3 and distributing device 15.

A plug-in connector arrangement 16 is provided on the lower side of distributing device 15 for coupling to a connecting connector part 19. Connecting connector part 19 is provided on outer tube 5 of the steering column and is linked to the motor vehicle electrical system by flexible power lines. Plug-in connector arrangement 16 is electrically connected to mating connecting parts 14 of distributing device 15. Plug-in connector arrangement 16 encompasses all plug-in contact elements necessary to provide an electrical connection between the steering column module and the vehicle electrical system. Thus, the steering column module and the vehicle electrical system are electrically connected when plug-in connector arrangement 16 is coupled to connecting connector part 19 and plug-in connector parts 13 are coupled to respective ones of mating connector parts 14.

One of the three functional satellite units 3 includes a plug-in connector part 13 which contains two plug-in contact elements 17. Plug-in contact elements 17 are guided without interruption directly into connecting connector part 19 through plug-in connector arrangement 16. Each of the two plug-in contact elements 17 can be contacted directly by one of the mating contact elements associated with the connecting connector part 19. The reason for the direct contact is because plug-in contact elements 17 are provided for the purpose of connecting an air bag to the vehicle electrical system and for safety reasons this connection must be as reliable as possible.

In order to assemble the steering column module, distributing device 15 is first installed in housing 4. Distributing device 15 is fixed in advance into housing 4 by way of retaining elements. The retaining elements are formed as one in the interior of housing 4 and which for the sake of simplicity are invisible in the FIGURE. Carrier 1 is then installed with functional base unit 2 installed in housing 4. In so doing four domes 22, which are formed on the lower side of carrier 1, engage in four corresponding orifices 23 provided on distributing device 15 and in the retaining elements of housing 4.

Simultaneously, plug-in connector part 13 of functional base unit 2 is coupled to the corresponding mating connector part 14 of distributing device 15, wherein the protective collar of the plug-in connector part engages in a positive-locking manner in the channel of the corresponding mating connector part. Housing 4 and thus also distributing device 15 are then finally fixed to carrier 1 by four further screws 20. For this purpose, the four domes 22 of carrier 1 are provided with threaded bores into which screws 20 are screwed.

Subsequently, the two functional satellite units 3, which are provided with tongues, are pushed onto carrier 1, wherein the groove and tongue connections act as guides and secure the positive-locking connection. Finally, the tongues engage completely into the channels of carrier 1 and plug-in connector parts 13 of the two functional satellite units 3 become connected to the corresponding mating connector parts 14 of distributing device 15. The protective collars, formed as one with plug-in connector parts 13, also engage into the channel of the two corresponding mating connector parts 14 for the purpose of producing an additional positive-locking connection.

Finally, the functional satellite unit 3, which can be fixed to carrier 1 by means of a screw connection, is attached to the carrier. To this end, the functional satellite unit 3 is placed on the upper side of carrier 1, wherein the spigot-shaped plug-in connector part 13 is guided past the side of the carrier and is coupled to the corresponding mating connector part 14 of distributing device 15. As already described, two plug-in contact elements 17 of this plug-in connector part 13 are guided directly into the plug-in connection arrangement 16 provided on the lower side of distributing device 15 for direct contact with a mating contact element associated with connecting connector part 19. The two plug-in contact elements 17 and the mating contact element of connecting connector part 19 directly contact each other because the corresponding mating connector 14 and plug-in connector arrangement 16 are disposed directly opposite one another as shown in the FIGURE. Also, for this plug-in connector part 13, the protective collar, formed as one, engages into a channel of the corresponding mating connector part 14 of distributing device 15 for producing a positive-locking connection. To finally fix the three functional satellite units 3, the functional satellite unit 3 having the two plug-in contact elements 17 is then attached by the two screws 21 to the upper side of carrier 1.

The steering column module can then be attached, completely preassembled, to outer tube 5 of the steering column. The complete steering column module is simply pushed onto outer tube 5, wherein by virtue of corresponding designed guiding elements plug-in connector arrangement 16 and connecting connector part 19 are automatically coupled. By means of simply pushing the complete steering column module onto outer tube 5 all the connections necessary for the connection of the steering column module to the motor vehicle electrical system are provided. In order to fix the complete steering column module, a screw driver is then inserted through orifice 7 located in housing 4 to actuate screw 10 of the attachment device and to fix carrier 1 by way of clamping against outer tube 5.

Thus it is apparent that there has been provided, in accordance with the present invention, a steering column module and a steering column module connection system that fully satisfy the objects, aims, and advantages set forth above.

While the present invention has been described in conjunction with specific embodiments thereof, it is evident that many alternatives, modifications, and variations will be apparent to those skilled in the art in light of the foregoing description.

For instance, distributing device 15 may include a printed circuit board formed by the pressed screen method having a plurality of copper-cased strip conductors for electrically connecting functional units 2 and 3 to the electrical system (not specifically shown). Electric components such as microcomputers may be allocated to the printed circuit board (not specifically shown). As another variation, distributing device 15 may be designed as a bus node and include a connection possibility to the data bus of the motor vehicle (not specifically shown).

Accordingly, the present invention is intended to embrace all such alternatives, modifications, and variations as fall within the spirit and broad scope of the appended claims.

What is claimed is:

1. A steering column module connection system for electrically connecting a steering column module to the electrical system of a motor vehicle, the steering column module having a plurality of functional units (2,3) provided in a region of the steering column of the motor vehicle below the steering wheel, the functional units (2,3) being encompassed by a housing (4) disposed in a plane perpendicular to the steering column, the functional units (2,3) being attached to the steering column by a carrier (1) and including a functional base unit (2) and a functional satellite unit (3), each of the functional units (2, 3) having upper and lower sides, the system comprising:

a plug-in connector part (13) provided on the lower side of each of the functional units (2, 3);

a plate-shaped distributing device (15) attached to the carrier (1), the distributing device (15) encompassing the steering column and being aligned substantially perpendicular thereto, the distributing device (15) having upper and lower sides;

mating connector parts (14) provided on the upper side of the distributing device (15), each one of the mating connector parts (14) being coupled to a respective one of the plug-in connector parts (13); and a single plug-in connector arrangement (16) provided on the lower side of the distributing device (15), the single plug-in connector arrangement (16) being electrically connected to the mating connecting parts (14) and coupling to a connecting connector part (19) provided on the steering column and being linked to the electrical system to electrically connect the steering column module to the electrical system when the plug-in connector parts (13) are coupled to respective ones of the mating connector parts (14) and the plug-in connector arrangement (16) is coupled to the connecting connector part (19).

2. The system of claim 1 wherein:

the plug-in connector part (13) of at least one of the functional units (2, 3) includes a plug-in contact element (17) which directly inserts into the plug-in connector arrangement (16) to be directly contacted by a mating contact element associated with the connecting connector part (19).

3. The system of claim 1 wherein:

the plug-in connector arrangement (16) includes a plurality of plug-in contact elements which are coupled to respective ones of a plurality of mating contact elements of the connecting connector part (19) when the plug-in connector arrangement (16) is coupled to the connecting connector part (19).

4. The system of claim 1 wherein:

the plug-in connector part (13) of at least one of the functional units (2, 3) has plug-in contact elements encompassed by a protective collar.

5. The system of claim 1 wherein:

the plug-in connector arrangement (16) has plug-in contact elements encompassed by a protective collar.

6. The system of claim 1 wherein:

each of the mating connector parts (14) has mating contact elements encompassed by a channel.

7. A steering column module for a steering column of a motor vehicle comprising:

a carrier (1) attached to the steering column;

a plurality of functional units (2, 3) provided in a region of the steering column below the steering wheel and encompassed by a housing (4) disposed in a plane substantially perpendicular to the steering column, the functional units (2,3) being attached to the carrier (1) and including a functional base unit (2) and a functional satellite unit (3), each of the functional units (2, 3) having an upper side facing the steering wheel and a lower side remote from the steering wheel;

a plug-in connector part (13) provided on the lower side of each of the functional units (2, 3);

a plate-shaped distributing device (15) attached to the carrier (1), the distributing device (15) encompassing the steering column and aligned perpendicular thereto, the distributing device (15) having an upper side facing the steering wheel and a lower side remote from the steering wheel;

mating connector parts (14) provided on the upper side of the distributing device (15), each one of the mating connector parts (14) being coupled to a respective one of the plug-in connector parts (13); and a single plug-in connector arrangement (16) provided on the lower side of the distributing device (15), the single plug-in connector arrangement (16) being electrically connected to the mating connecting parts (14) and coupled to a connecting connector part (19) provided on the steering column and linked to the electrical system to electrically connect the steering column module to the electrical system.

8. The steering column module of claim 7 wherein:
the carrier (1) forms a partial portion (11) of the functional base unit (2).

9. The steering column module of claim 7 wherein:
the functional base unit (2) is a steering column switch having an operating lever.

10. The steering column module of claim 7 wherein:
the functional satellite unit (3) is a steering angle sensor.

11. The steering column module of claim 7 wherein:
the plug-in connector part of the functional satellite unit (3) has plug-in contact elements for electrically connecting an air bag to the electrical system.

12. The steering column module of claim 7 wherein:
the functional satellite unit (3) is a switch having at least one operating element in the form of a button.

13. The steering column module of claim 7 wherein:
the housing (4) is fixed directly on the carrier (1).

14. The steering column module of claim 7 wherein:
an attachment device is provided on the carrier (1), wherein the attachment device is actuated by means of a screw (10) and exerts clamping forces on an outer tube (5) of the steering column when actuated.

15. The steering column module of claim 14 wherein:
the housing (4) is provided with an orifice (7) through which a screwdriver can be guided to actuate the screw (10).

* * * * *